Patented Nov. 22, 1927.

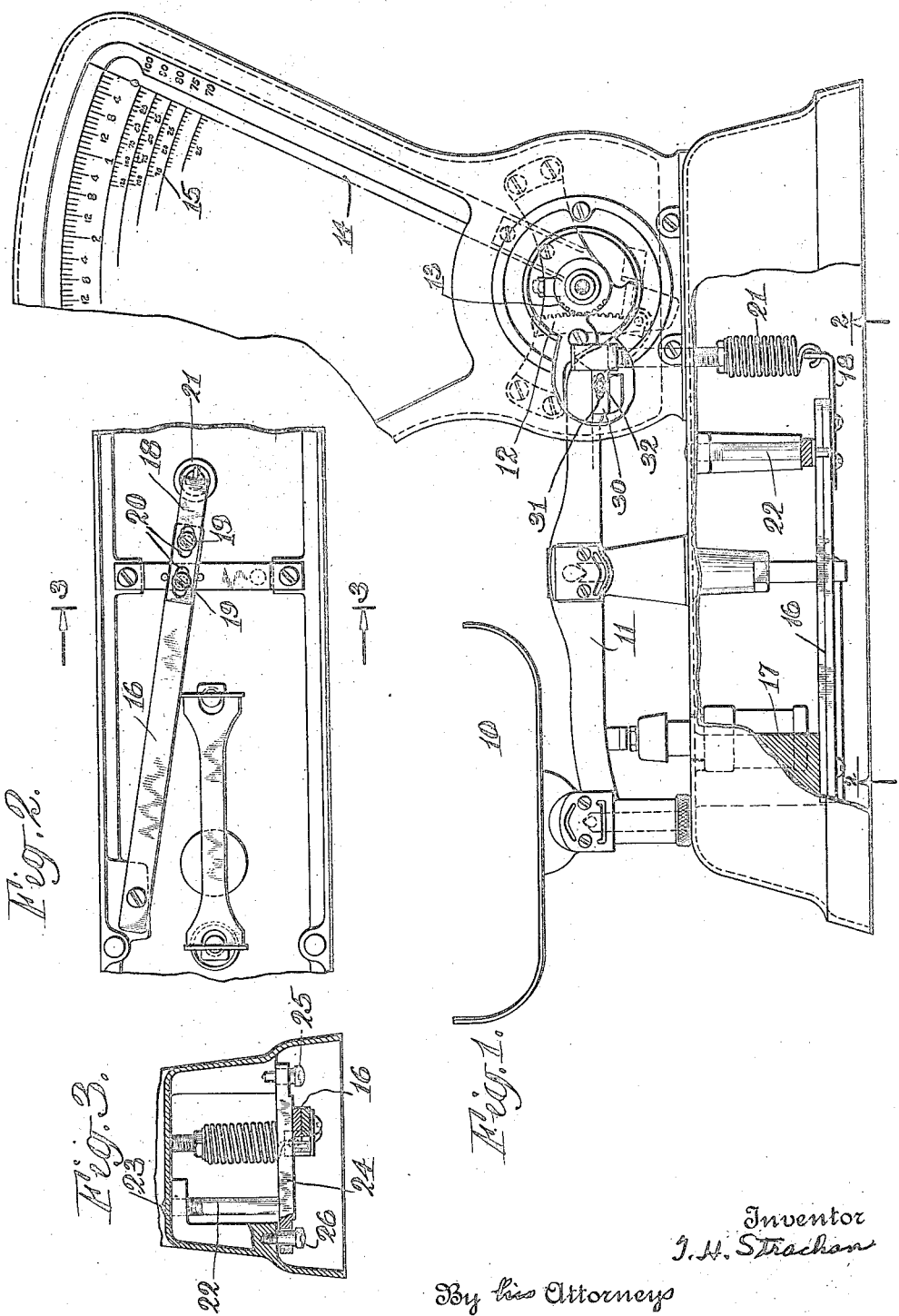

1,650,243

UNITED STATES PATENT OFFICE.

THOMAS H. STRACHAN, OF DAYTON, OHIO, ASSIGNOR TO DAYTON SCALE COMPANY, OF DAYTON, OHIO, A CORPORATION OF NEW JERSEY.

ZERO ADJUSTING DEVICE FOR SCALES.

Application filed August 1, 1925. Serial No. 47,473.

This invention relates to improvements in weighing scales and is more particularly directed to the improvement of the scale shown in Hopkinson Patent No. 1,012,640. The present invention has for its object the provision of a simple zero adjustment device for the scale shown in the aforesaid patent. A further object of the invention resides in the provision of a novel means for securing the load counterbalancing spring to the thermostat and to the general end that variations in range of the indicator travel may be secured by varying the leverage which acts upon the load counterbalancing spring.

Referring to the drawings,

Fig. 1 shows a front elevation view of a scale embodying my improvements. The above casing is broken away to show interior construction.

Fig. 2 shows a bottom view of certain of the parts in the base of the scale, the view being taken as indicated by arrows 2—2 on Fig. 1.

Fig. 3 is a detail sectional view, the section being taken on line 3—3 of Fig. 2.

The scale comprises the usual pan 10, pivotally supported upon lever 11 carrying a sector rack 12 meshing with an indicator gear segment 13 arranged to move the indicator 14 in the usual manner over chart 15. As in the previous Hopkinson patent, a bi-metallic thermostatic element is provided in the base of the scale, this element being designated 16. The element is preferably supported at one end by boss 17. A spring clip member 18 is adjustably supported upon the end of the thermostatic element 16 by screws 19 which are threaded into the thermostatic element and which extend through slots 20 in clip member 18. The load counterbalancing spring 21 is attached to the clip member 18 and also to the lever 11.

Adjustment of the scale zero position is preferably effected by means of a stud 22, which stud is threaded to cooperate with threads in the base housing at its upper end and is also slotted as indicated at 23 to receive a screw-driver or like implement. The lower end of the stud 22 bears upon a cross-piece 24, which cross-piece or bridge member is loosely guided at its ends by studs 25 and 26 which are threaded into the base casing. It will be understood that by screwing down on stud 22, member 24 will be pressed down rocking about 25 and thereby pressing downwardly upon the bi-metallic thermostatic member 16 which directly underlies the member 24. By properly adjusting the stud 22, greater or less tension may be applied to the spring whereby an adjustment of the scale zero may be obtained.

The range of travel of the scale indicator 15 may be also varied by adjusting spring clip member 18 in or out relative to part 16 which supports it.

The point of connection of the spring 21 to the lever 11 may also be varied by adjusting a block 30 relative to the lever. This block 30 is slotted as shown at 31 to receive clamping bolt 32.

The use of the loose cross piece bar or member 24 provides for imparting adjusting movement to the thermostatic bar without marring the bar during the adjusting operation, thus preventing the effecting of irregular adjustments.

I claim—

1. A scale having a base housing, a thermostat bar carried thereby, and having a load counterbalancing spring connected therewith, means for adjusting the zero of the scale comprising a stud threaded in the housing for adjustment relatively thereto and a loosely supported cross piece overlying the thermostatic bar and underlying the end of the stud to position the thermostatic bar.

2. A scale having a base housing, a spring supporting bar carried by said base, a bridge member overlying said bar and loosely supported at its ends by said base housing, and a zero adjustment screw bearing at its end upon said bridge member for the purpose described.

3. A weighing scale having a lever, a thermostatic bar, a spring connected to said bar and said lever, and a clip support for said spring adjustably secured upon said bar so as to be capable of longitudinal adjustment thereon for the purpose described.

4. A weighing scale having a scale lever, a thermostatic bar and a load counterbalancing spring connecting said bar and lever, means connecting said lever and spring adjustable to shift the spring longitudinally of the lever for the purpose described.

5. A weighing scale having a scale lever, a thermostatic bar and a load counterbalancing spring connecting said bar and lever, means connecting said bar and spring adjustable to shift the spring longitudinally of the bar for the purpose described.

6. A weighing scale having a scale lever, a thermostatic bar, a load counterbalancing spring connecting said bar and lever, means connecting said bar and said spring and adjustable longitudinally of the bar whereby the spring may be moved along the bar, and a connection between said lever and said spring adjustable longitudinally of the lever whereby the spring may be moved along said lever.

In testimony whereof I hereto affix my signature.

THOMAS H. STRACHAN.